(12) United States Patent
Völz et al.

(10) Patent No.: US 8,459,433 B2
(45) Date of Patent: Jun. 11, 2013

(54) PARKING LOCK SYSTEM FOR AN AUTOMATIC TRANSMISSION

(75) Inventors: Michael Völz, Diepholz (DE); Ludger Rake, Diepholz (DE); Andreas Giefer, Lemförde (DE); Sascha Rosentreter, Espelkamp (DE); Roland König, Habach (DE)

(73) Assignees: ZF Friedrichshafen AG, Friedrichshafen (DE); Bayerische Motoren Werke AG, Munich (DE)

( * ) Notice: Subject to any disclaimer, the term of this patent is extended or adjusted under 35 U.S.C. 154(b) by 334 days.

(21) Appl. No.: 12/921,590

(22) PCT Filed: Mar. 26, 2009

(86) PCT No.: PCT/DE2009/050011
§ 371 (c)(1),
(2), (4) Date: Sep. 9, 2010

(87) PCT Pub. No.: WO2009/118004
PCT Pub. Date: Oct. 1, 2009

(65) Prior Publication Data
US 2011/0005890 A1    Jan. 13, 2011

(30) Foreign Application Priority Data
Mar. 27, 2008    (DE) .......................... 10 2008 000 857

(51) Int. Cl.
*F16H 63/38*    (2006.01)
*B60T 1/00*    (2006.01)
*F16C 1/22*    (2006.01)

(52) U.S. Cl.
USPC ................ 192/220.7; 192/220.2; 192/220.4

(58) Field of Classification Search
USPC .... 192/220.2, 220.3, 220.4, 220.7; 74/473.12
See application file for complete search history.

(56) References Cited

U.S. PATENT DOCUMENTS

| | | | | |
|---|---|---|---|---|
| 5,402,870 A | * | 4/1995 | Osborn | 192/220.7 |
| 5,494,141 A | * | 2/1996 | Osborn et al. | 192/220.4 |
| 6,109,414 A | * | 8/2000 | Tomida et al. | 192/220.7 |
| 6,124,789 A | | 9/2000 | Bark | |
| 6,349,613 B1 | * | 2/2002 | Tsuge et al. | 74/501.5 R |

FOREIGN PATENT DOCUMENTS

| | | |
|---|---|---|
| DE | 196 41 858 A1 | 4/1997 |
| DE | 101 57 460 A1 | 6/2003 |
| DE | 10 2005 002 446 A1 | 7/2006 |
| WO | 2008/022617 A1 | 2/2008 |

OTHER PUBLICATIONS

Non-English International Search Report dated Jul. 29, 2009.

* cited by examiner

*Primary Examiner* — Rodney Bonck
(74) *Attorney, Agent, or Firm* — Norris McLaughlin & Marcus, P.A.

(57) ABSTRACT

A parking lock for an automatic transmission of a motor vehicle is provided, wherein the automatic transmission has an actuator which can disengage a locking element in the automatic transmission, the locking element is held in a locked position by spring force, and a locking assembly (1) is provided which is connected via an actuating element (2) to the locking element and which has a knee lever (3) which can fix the actuating element (2) so as to prevent engagement of the locking element in the automatic transmission. The invention is characterized in that the knee lever (3) fixes the actuating element (2) in an overextended position, wherein a fixed counter support (4) is attached at the overextended side of the knee lever (3).

18 Claims, 3 Drawing Sheets

PARKING LOCK SYSTEM FOR AN AUTOMATIC TRANSMISSION

This is an application filed under 35 USC §371 of PCT/DE2009/050011, claiming priority to DE 10 2008 000 857.5 filed on Mar. 27, 2008.

BACKGROUND OF THE INVENTION (1) Field of the Invention

The invention relates to a parking lock system for an automatic transmission of a motor vehicle, wherein the automatic transmission has an actuator which can disengage a locking element in the automatic transmission, with the locking element being held in the locked position by spring force, and a locking assembly is provided which is connected to the locking element by means of an actuating element and which has a knee lever which can fix the actuating element so as to prevent engagement of the locking element in the automatic transmission.

(2) Description of Related Art

Parking lock systems of this type are required in conjunction with automatic transmissions of motor vehicles. They are used to prevent in the event of a system failure a locking element in the automatic transmission from engaging in a transmission pinion, and hence unintended blocking of the transmission—for example in the event of a system failure during travel. However, the function of the locking element is designed so that it engages—in the absence of specific countermeasure—in a transmission pinion with a spring force so as to prevent unintentional movement of the vehicle—even in the event of a system failure—when the parking lock is engaged. If such locking element were to engage automatically with the transmission during travel, i.e., when the automatic shifter is not in the "P" position, then the transmission could be damaged. The driving safety may also be seriously impaired.

A number of parking lock systems with interlock assemblies are known in the art. In particular, the laid-open application DE 10 2005 002 446 A1 should be mentioned, which discloses a parking lock of an automatic transmission for a motor vehicle which can be held in its unlocked position by a locking member, which can be operated with an actuating drive and moved by a spring force into the locked position, with a holding device, which is provided in addition to the actuating drive and acts upon the locking member by way of a locking element configured to hold the locking member in its unlocked position. The holding device has a knee lever with a first knee lever part, a knee lever joint, and a second knee lever part, wherein the knee lever is locked in the unlocked position of the locking member by way of a locking element in a nearly extended position.

Such implementation of a parking lock, which also corresponds to the preamble of the present claim, goes fundamentally in the intended direction, because by using the knee lever the parking lock can be locked or unlocked, respectively, by applying relatively small forces.

Disadvantageously, however, the knee lever in the locking assembly for the parking lock according to the state-of-the-art must be precisely adjusted, because it is almost impossible to incorporate tolerances in the illustrated embodiment, so that this type of embodiment requires a correspondingly high adjustment complexity during installation of the parking lot system, in particular the locking assembly, which must be adapted to the individual installation position.

It is therefore an object of the invention to provide a parking lock system for an automatic transmission of a motor vehicle with a locking assembly, wherein the locking assembly should be designed to enable greater tolerances in the adjustment after installation of the system or to eliminate additional adjustments entirely.

BRIEF SUMMARY OF THE INVENTION

The object is solved with the features of the independent claims. Advantageous embodiments are recited in the dependent claims and described in the description.

The inventors have realized that one fundamental problem of the locking assembly of a parking lock according to DE 10 2005 002 446 A1 is that the knee lever disclosed therein is prevented by a movable stop from deviating from the almost extended position. In this extended position, however, the knee lever is on the same side on which it finally also deviates. A significantly safer position of the knee lever is attained by overextending the knee lever towards the opposite side, meaning beyond its pressure point, so that again a minimum force needs to be applied to move the knee lever again from this overextended position to a deviated position. To accomplish this, a fixed stop must be arranged on the overextended side of the knee lever which prevents further overextension and hence again deviating of the knee lever on the wrong side.

According to another modification which drastically increases the adjustment tolerances of the locking assembly of the parking lock, the actuating element which is fixed by the knee lever is not rigidly connected to the end of the knee lever, but can rather move along the end of the knee lever over a certain tolerance distance under a spring force, wherein a fixed stop should obviously be provided on both sides of the tolerance distance.

With the realization, the inventors propose to improve a conventional parking lock system for an automatic transmission of a motor vehicle so that the knee lever fixes the actuating element in an overextended state, wherein a fixed counter support is attached on the overextended side of the knee lever.

According to another improvement according to the invention of this conventional parking lock system it is proposed to connect the actuating element with one end of the knee lever by a spring force.

According to an advantageous embodiment of the parking lot system according to the invention and its locking assembly, the inventors further propose that the actuating element extends in a sliding bearing on one end of the knee lever, wherein a first spring element is arranged on one side of the actuating element between a first stop on the actuating element and the sliding bearing, and a second stop is arranged on the actuating element on the other side of the sliding bearing.

With this embodiment, a particularly large tolerance range for adjustment of the knee lever is attained, making particular adjustment measures that would depend on the installation position practically unnecessary.

The inventors further propose that a second spring element is acting upon the knee lever with a spring force which operates in the direction of overextending the knee lever. With this measure, the knee lever, as soon as it attains a relaxed position, is automatically guided into an overextended fixed position and also held in this position by the spring force, thereby reliably fixing the knee lever and hence the actuating element. This embodiment can be advantageously and easily implemented by arranging the second spring element on the center axis between two lever arms of the knee lever. Basically, there is also the possibility to have the actuating element act upon one of the two outer axes or upon the knee lever by way of an external spring element, so that the knee lever is deflected by the spring force of the external spring element in the direction of overextension.

According to another advantageous embodiment of the parking lock according to the invention and its locking assembly, a remotely controlled actuator is provided which can act upon the knee lever and transfer the knee lever from the overextended and fixed position to a movable position. This may be, for example, an electromagnet which moves a push rod which directly acts upon one of the levers of the knee lever. Alternatively, an electromagnet alone may be used as remotely controlled actuator, which operates against a permanent magnet attached on the knee lever. A repulsive effect with respect to the permanent magnet is then produced when the electromagnet is switched on, which causes the permanent magnet to travel the small distance beyond the dead center due to the repulsive magnetic forces.

The actuating element may be, for example, a Bowden cable or a rod assembly to which the aforementioned locking element of the automatic transmission is connected.

Advantageously, the locking assembly of the parking lock is constructed so that the end of the knee lever upon which the actuating element acts is supported in a guide. This prevents a lateral load on the actuating element, so that the actuating element or the Bowden cable, respectively, performs a uniquely defined linear movement by deviating or extending the knee lever along the direction of the Bowden cable. If necessary, the aforedescribed locking assembly of the parking lock can be intentionally unlocked, i.e., allowing engagement of the parking lock after failure of the systems, an application point for a tool may be provided on one of the lever arms of the knee lever, by which the knee lever can be moved manually out of or into the overextended position. Such application point may be, for example, an insertion sleeve for a tool, into which the tool, for example a screwdriver, is inserted, so that the parking lock can be manually unlocked and hence engaged with the help of onboard tools so as to secure the vehicle against unintentional rolling. Conversely, a manual lock can also be applied.

Advantageously, the locking assembly can be directly attached to a shifting assembly. In this way, the locking assembly of the parking lock system can be readily combined with the installation of the shifting assembly, thereby obviating the need for additional assembly steps during installation of the shifting assembly.

Also part of the invention is a shifting assembly for an automatic transmission, which includes the aforedescribed parking lock system, and an automatic transmission which also includes this parking lock system.

The invention will now be described in more detail with reference to the drawings and to an exemplary embodiment. It is shown in:

DETAILED DESCRIPTION OF THE INVENTION

Figure 1:
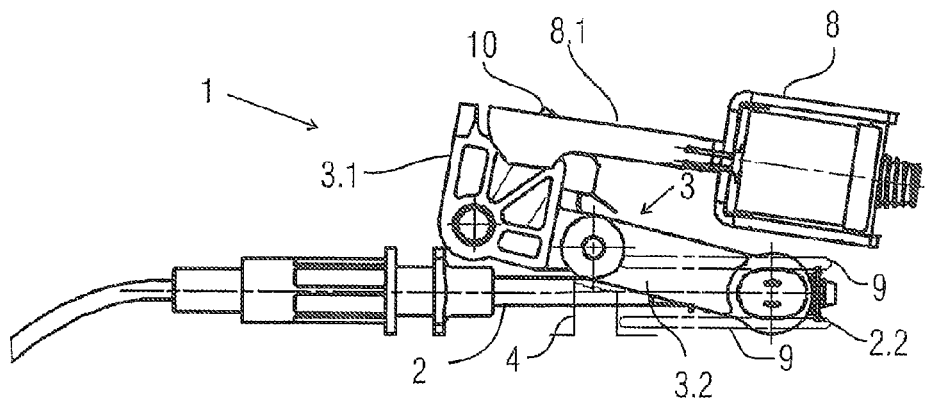
FIG. 1 a side view of a locking assembly of a parking lock system.

FIG. 1 shows a locking assembly 1 according to the invention of a parking lock system of an automatic transmission for a motor vehicle in a side view. Shown is a Bowden cable 2, which is directly connected with the positioning of a locking element of the parking lock system on an automatic transmission of a motor vehicle and which moves synchronously with the positioning of this locking element in the longitudinal direction. A knee lever 3 consisting of a first attached lever arm 3.1 and a second free lever arm 3.2 is attached on the end of the Bowden cable 2, wherein the first attached lever arm 3.1 is rotatably affixed on one side of an attached axis, whereas the other side is connected via a freely movable axis with the second free lever arm 3.2. The second free lever arm 3.2 is rotatably attached on the end of the Bowden cable 2.

Figure 2:
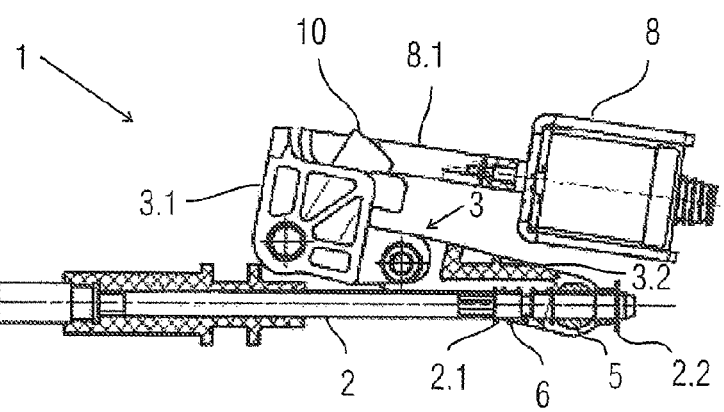
FIG. 2 a longitudinal cross-section of the locking assembly with knee lever in a slightly overextended position and Bowden cable in normal position.

FIG. 2 shows the knee lever 3 shortly before the maximally extended position, wherein overextending causes the knee lever to move against a fixed counter support 4 and remain in this position. Small forces are sufficient to move the lever arm from this position again into a deviated position. These small forces required for relaxing the knee lever 3 can be provided, for example, by an electromagnet 8 which acts via a push rod 8.1 upon the attached lever arm 3.1 and moves the knee lever 3 from the slightly overextended position again into the deviated position. To prevent a lateral load on the Bowden cable 2 and to absorb any transverse forces that may be generated by the knee lever 3, the end of the Bowden cable is guided in a guide 9 in the longitudinal direction of the Bowden cable 2.

FIG. 2 shows the locking assembly 1 of FIG. 1, here in a longitudinal cross-section. The Bowden cable 2 acting upon the free and 3.2 of the knee lever 3 can be clearly seen. In the cross-sectional view, the attachment position of the Bowden cable 2 at the end of the knee lever 3 can be clearly identified. To compensate for manufacturing tolerances or other tolerances during installation and positioning of the locking assembly, a particular attachment mode of the Bowden cable 2 on the knee lever 3 is selected. The Bowden cable 2 extends in a terminal axis formed as a sliding bearing 5. The Bowden cable 2 has a first stop 2.1 on the left side, against which a coil spring 6 presses, which is in turn supported against the sliding bearing 5. A second stop 2.2 is arranged on the other side of the sliding bearing 5 which prevents the Bowden cable 2 from slipping out of the sliding bearing 5. In this way, the Bowden cable 2 can be guided into an overtravel position relative to the sliding bearing 5 and hence relative to the knee lever, as soon as the travel of the Bowden cable 2 is greater than allowed by the maximal extension of the knee lever 3.

Figure 3:
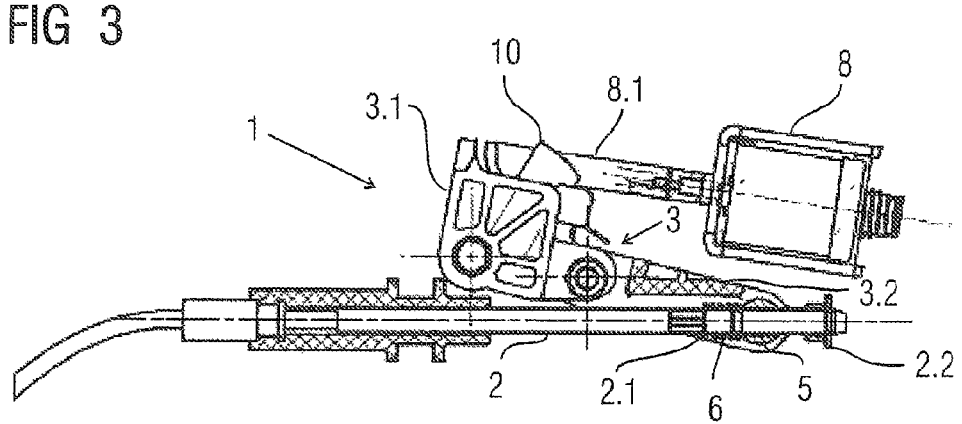
FIG. 3 the locking assembly in a longitudinal cross-section with the knee lever in a slightly overextended position and the Bowden cable in an over-travel position.

Such overtravel position is illustrated in FIG. 3. FIG. 3 shows the same longitudinal cross-section as FIG. 2 through the locking assembly, whereby only the Bowden cable 2 is moved farther outwardly towards the right side than allowed by the extension of the knee lever, thus exhibiting overtravel. This overtravel is taken up by the spring 6, thereby preventing damage to both the locking assembly and the locking element in the automatic transmission.

With this configuration of the knee lever 3 with a fixed counter support on the overextended side of the knee lever, the knee lever is securely held, on one hand, even when the vehicle rattles; at the same time, this spring-loaded attachment of the Bowden cable on the end of the knee lever system can safely eliminate tolerances in the transmission, as well as in the Bowden cable and parking lock holding mechanism.

Figure 4:
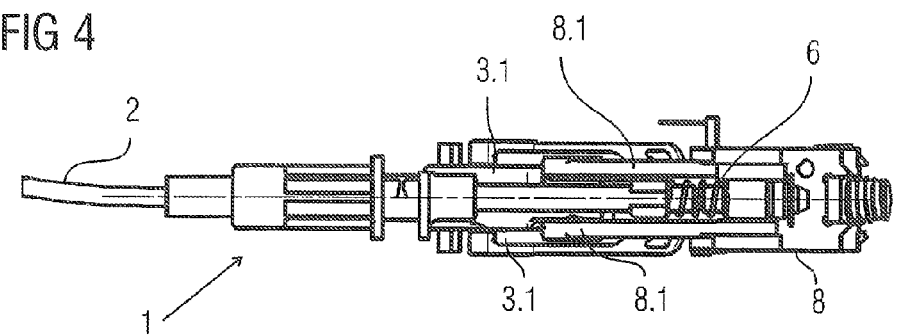
FIG. 4 a top view on the locking assembly of FIG. 1.

FIG. 4 shows the interlock assembly 1 of FIGS. 1 to 3 in a top view, with the electromagnet 8 with the fork-shaped push rod 8.1 clearly visible in the top view. The push rod 8.1 presses during extension against the attached lever arm 3.1 of the knee lever, thereby moving the knee lever from the fixed overextended position into a deviated position.

Figure 5:
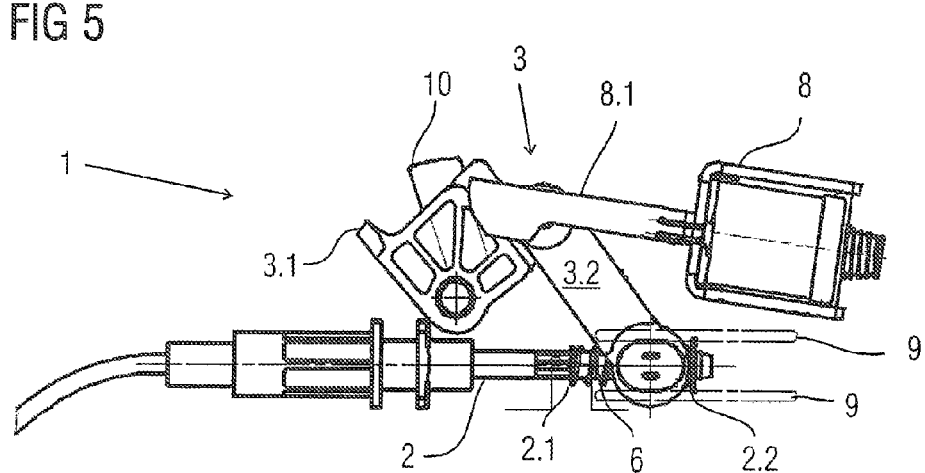
FIG. 5 a side view of the locking assembly according to FIG. 1, however with the knee lever in an angled position.
Figure 6:
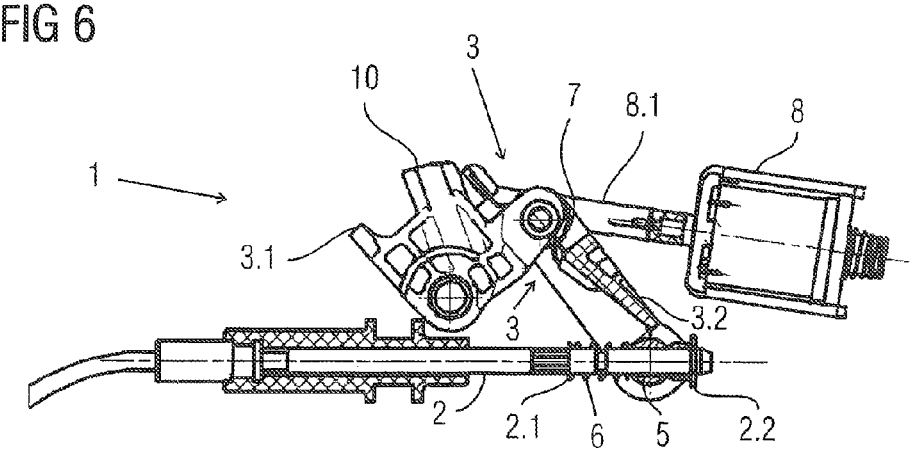
FIG. 6 the locking assembly of FIG. 5 in a longitudinal cross-section.

FIGS. 5 and 6 show the locking assembly 1 once more in a side view (FIG. 5) and in a longitudinal cross-sectional view (FIG. 6), wherein the knee lever 3 is illustrated in the deviated position. The Bowden cable 2 is here moved to the left, so that the knee lever 3 with the two lever arms 3.1 and 3.2 is deviated, wherein the stop 2.2 causes the second lever arm 3.2 to be carried along by the Bowden cable. FIG. 6 shows a leg spring 7 which is attached to the center axis of the knee lever in such a way that the two lever arms 3.1 and 3.2 are moved by the spring force of the leg spring towards an overextended position.

In addition, FIGS. 1, 2, 3, 5 and 6 show on the first attached lever arm 3.1 a sleeve 10 into which, for example, a screwdriver or another onboard tool, optionally also a special onboard tool, can be inserted, so that in the event of a failure of all systems, in particular of the electromagnet 8, the knee lever 3 can be overextended with a simple manual manipulation, thereby disengaging the locking element in the automatic transmission and allowing the vehicle to move. On the other hand, with a corresponding manipulation with an onboard tool, the knee lever can be moved from an overextended position into a deviated position, thereby allowing the parking lock to engage.

Figure 7:
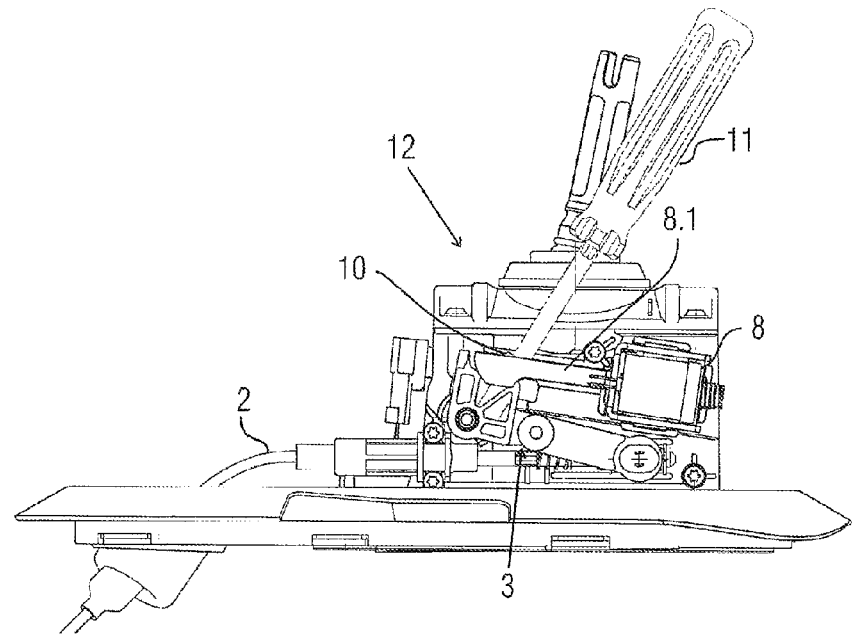
FIG. 7 a shifting assembly with a flanged-on locking assembly in a side view, with the knee lever in a slightly overextended position.
Figure 8:
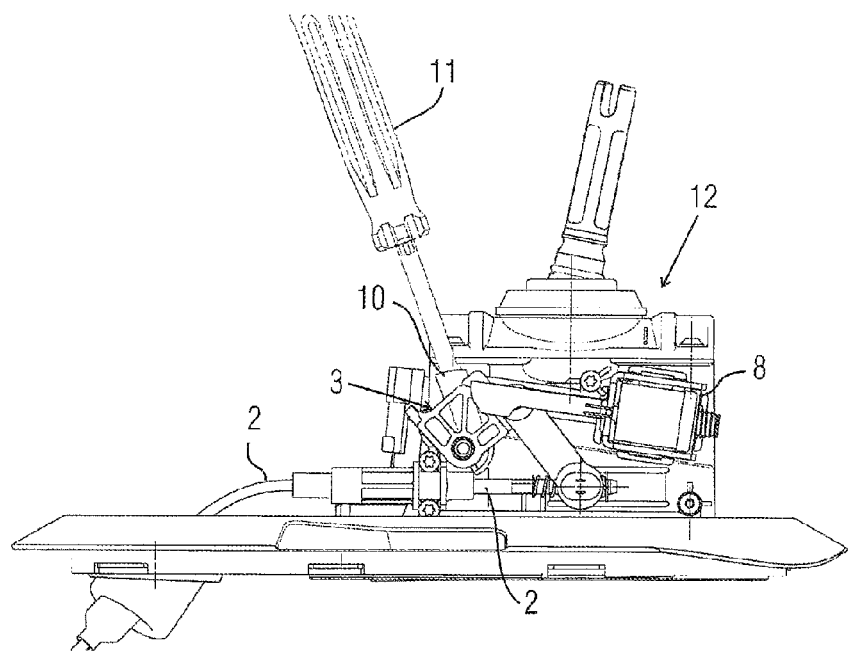
FIG. 8 the shifting assembly with an unlocking assembly according to FIG. 7, however with the knee lever in an angled position.

FIGS. 7 and 8 show an exemplary installation position of the above-illustrated locking assembly on a shifting assembly 12 in a side view. The locking assembly is screwed onto the side of the shifting assembly 12, wherein FIG. 7 shows the knee lever in the extended position and FIG. 8 shows the knee lever in a deviated position. In addition, both Figures show a screwdriver 11 which is inserted into the sleeve 10 on the lever arm of the knee lever, allowing manipulation of the position of the knee lever.

Due to the advantageous construction, the locking assembly according to the invention of the parking lock exhibits only little friction even under varying environmental conditions and requires only small forces for disengagement. In addition, the requirement for dimensional accuracy of the components is not as stringent as with conventional systems, because in an extended position of the knee lever only small forces are required to collapse the system. The triggering actuator, the electromagnet, only requires small forces. The illustrated boundary conditions therefore reduce the manufacturing costs for the locking assembly commensurately.

It will be understood that the aforedescribed features of the invention can be used not only in the described combination, but also in other combinations or alone, without going beyond the scope of the invention. It is also within the scope of the invention to mechanically reverse the functions of the individual mechanical elements of the invention.

LIST OF REFERENCE SYMBOLS

1 Locking assembly
2 Actuating element/Bowdon cable
2.1 First stop
2.2 Second stop
3 Toggle joint
3.1 Attached lever arm
3.2 Free lever arm
3.3 Free end of the lever arm
4 Fixed counter support
5 Sliding bearing
6 Overtravel spring
7 Leg spring
8 Electromagnet
8.1 Push rod
9 Guide
10 Sleeve
11 Screwdriver
12 Shifting assembly

The invention claimed is:

1. A parking lock system for an automatic transmission of a motor vehicle, wherein the parking lock system comprises
    (a) an actuating element for disengaging a locking element in the automatic transmission,
    (b) the locking element is held in a locked position by spring force, and
    (c) a locking assembly is provided which is connected via the actuating element to the locking element and which includes a knee lever for fixing the actuating element so as to prevent engagement of the locking element in the automatic transmission,
        wherein the knee lever fixes the actuating element in an overextended state, and wherein the knee lever is in physical contact with a fixed counter support while in the overextended state, and wherein the knee lever comprises two lever arms including a first lever arm rotatably affixed on one side of an attached axis and a second free moving lever arm.

2. The parking lock system according to claim 1, wherein the actuating element is connected with one end of the knee lever by way of a spring force.

3. The parking lock system according to claim 2,
    wherein the actuating element extends in a sliding bearing on one end of the knee lever,
    wherein a first spring element is arranged on one side of the actuating element between a first stop on the actuating element and the sliding bearing, and
    a second stop is arranged on the actuating element on the other side of the sliding bearing.

4. The parking lock system according to claim 1, comprising a second spring element, the second spring element is acting upon the knee lever with a spring force which operates in a direction of overextending the knee lever.

5. The parking lock system according to claim 4, wherein the second spring element is arranged on a center axis between the first and second lever arms of the knee lever.

6. The parking lock system according to claim 1, wherein a remotely controlled actuator is provided which acts upon the knee lever and transfers the knee lever from the overextended and fixed position to a movable position.

7. The parking lock system according to claim 6, wherein the remotely controlled actuator is an electromagnet with a push rod.

8. The parking lock system according to claim 6, wherein the remotely controlled actuator is an electromagnet which acts in opposition to a permanent magnet attached on the knee lever.

9. The parking lock system according to claim 7, wherein the push rod presses during extension against only the first lever arm of the knee lever, thereby moving the knee lever from the overextended position into a deviated position.

10. The parking lock system according to claim 1, wherein the actuating element is a Bowdon cable.

11. The parking lock system according to claim 1, wherein the actuating element is a rod assembly.

12. The parking lock system according to claim 1, wherein the end of the knee lever upon which the actuating element acts is supported in a guide.

13. The parking lock system according to claim 1, wherein an application point for a tool is provided on one of the first or second lever arms of the knee lever, by which the knee lever is moved manually out of the overextended position.

14. The parking lock system according to claim 13, wherein the application point for the tool is an insertion sleeve, into which the tool is inserted.

15. The parking lock system according to claim 14, wherein the tool is a screwdriver.

16. The parking lock system according to claim 1, wherein the locking assembly is attached directly on a shifting assembly.

17. A shifting assembly for an automatic transmission, comprising a parking lock system according to claim 1.

18. An automatic transmission, comprising a parking lock system according to claim 1.

\* \* \* \* \*